(12) United States Patent
Parry et al.

(10) Patent No.: US 12,513,874 B2
(45) Date of Patent: Dec. 30, 2025

(54) CELLPHONE SIGNAL ENCLOSURE WITH ANTENNA

(71) Applicants: Mikel Parry, Leeds, UT (US); Samuel Judd, St. George, UT (US)

(72) Inventors: Mikel Parry, Leeds, UT (US); Samuel Judd, St. George, UT (US)

( * ) Notice: Subject to any disclaimer, the term of this patent is extended or adjusted under 35 U.S.C. 154(b) by 469 days.

(21) Appl. No.: 18/147,312

(22) Filed: Dec. 28, 2022

(65) Prior Publication Data

US 2023/0209787 A1 Jun. 29, 2023

Related U.S. Application Data

(60) Provisional application No. 63/294,153, filed on Dec. 28, 2021.

(51) Int. Cl.
*H05K 9/00* (2006.01)

(52) U.S. Cl.
CPC .................................. *H05K 9/0007* (2013.01)

(58) Field of Classification Search
None
See application file for complete search history.

(56) References Cited

U.S. PATENT DOCUMENTS

| | | | | |
|---|---|---|---|---|
| 9,979,427 | B2* | 5/2018 | Thomas | H04B 1/3888 |
| 2016/0157075 | A1* | 6/2016 | Ho | H04W 56/0015 |
| | | | | 455/404.1 |
| 2020/0014102 | A1* | 1/2020 | Anderson | H01P 3/06 |
| 2020/0350943 | A1* | 11/2020 | Zhan | H04B 1/38 |
| 2023/0115018 | A1* | 4/2023 | Anderson | H05K 9/002 |
| | | | | 379/428.01 |

FOREIGN PATENT DOCUMENTS

AU 2013269140 A1 * 1/2015 ............ H02J 50/001

* cited by examiner

*Primary Examiner* — Idowu O Osifade
(74) *Attorney, Agent, or Firm* — Gurr & Brande, PLLC; Robert A. Gurr

(57) ABSTRACT

A cellphone signal enclosure system includes a faraday enclosure having an internal antenna, the internal antenna having a connector exposed on the exterior of the enclosure for coupling to a cable, the faraday enclosure prohibiting RF signals from exiting the faraday enclosure; and, a cable couplable to the connector, the cable coupled to an external antenna on its opposite end. The external antenna sends and receives signals, via the cable, to the internal antenna, the internal antenna being in communication with a wireless device (e.g., cellphone, smartwatch, tablet, etc.) inside the faraday enclosure. In some examples, the external antenna and the cable are detachable, allowing customization for a user's needs. In some examples, the cellphone signal enclosure includes a touch-sensitive window and blue light filter that reduces eye strain, while still blocking RF signals.

15 Claims, 9 Drawing Sheets

CELLPHONE SIGNAL ENCLOSURE WITH ANTENNA

CROSS-REFERENCE TO RELATED APPLICATIONS

This application claims the benefit of U.S. Provisional Application Ser. No. 63/294,153 filed on Dec. 28, 2021, which is incorporated herein by reference.

TECHNICAL FIELD

The present disclosure relates to faraday cages and cellphone signal blocking devices. More particularly, the present disclosure relates to an enclosure for shielding cellphone signals, and transmitting them via a cable and an antenna.

BACKGROUND

The use of wireless technologies has grown significantly in recent years, with an increasing number of household and consumer devices now emitting an array of wireless signals. Of particular note, cellphones, smartwatches, and tablets tend to be in contact with a user, or in close proximity thereto, almost twenty-four hours a day. For example, even when a user is sleeping, a smartphone or electronic device may be adjacent to the user, such as on a nightstand, where it continues to emit wireless signals.

While the full impact of these wireless signals on the body is unknown, sleep disruption has been linked to wireless signals radiated from an array of devices. Other known health risks exist as well, such as for users with pacemakers. Studies have shown that wireless devices might interfere with implanted cardiac pacemakers if used within eight inches of the pacemaker. As a result, the FDA has issued precautions for pacemaker wearers using wireless technologies.

Therefore, there is a need to reduce or block wireless signals (e.g., RF signals) emitted by devices for the health and safety of users. To solve this need, RF blocking cases and pouches have been introduced. These cases/pouches block all signals emitted from a device, creating a safer environment for a user when the device is not in use. For example, a user may place their cellphone into an RF blocking case before bed so as to reduce the radiation emitted during sleep, thereby reducing sleep disruption. However, while this solution prevents radiation exposure, it also prevents all communication with the cellphone. In other words, many users do not have a landline, so their cellphone is their only means of communication. If the cellphone signals are entirely blocked, no communication can get through to a user. This can be detrimental, especially in emergencies where it is imperative to reach a user.

As a result, there is a need to block the radiation exposure to a user of a wireless device, while simultaneously allowing the device to continue its functionality. Additionally, signal-sensitive environments require signals to be absent or greatly reduced. Accordingly, there is a need for a wireless emitting device, such as a cellphone, smartwatch, or other device, to be adequately shielded (i.e., wireless transmission reduced) while still maintaining its ability to function.

Further, various spectrums of light, such as blue light, can have a negative effect on users. Blue screen filters have been introduced to reduce exposure to blue light, but do not reduce wireless radiation. Accordingly, there is a need for a device that not only blocks harmful light spectrums, but that also blocks wireless radiation exposure. The present disclosure seeks to solve these and other problems.

SUMMARY OF EXAMPLE EMBODIMENTS

In some embodiments, a cellphone signal enclosure system comprises an enclosure comprising an internal antenna configured to wirelessly communicate with a cellphone, the internal antenna having a connector exposed on the exterior of the enclosure couplable to a cable, the cable coupled to an external antenna at a distance from the enclosure, wherein the enclosure prohibits RF signals from exiting the enclosure. The external antenna is configured to send and receive signals, via the cable, to the internal antenna, the internal antenna in communication with a wireless device (e.g., cellphone, smartwatch, tablet, etc.) inside the enclosure.

In some embodiments, the enclosure comprises a flexible, touch-sensitive window, allowing a user to interact with a wireless device therein. In some embodiments, the window also blocks blue light. In some embodiments, the enclosure comprises a wireless charger. In some embodiments, the enclosure is configured to allow magnetic fields to pass therethrough, allowing a user to utilize a third-party wireless charger external to the enclosure.

In some embodiments, the external antenna is couplable to the exterior of a building. The cellphone enclosure system may further comprise an RF signal amplifier configured to amplify the signal strength of the wireless device within the enclosure.

DETAILED DESCRIPTION OF EXAMPLE EMBODIMENTS

Figure 1:
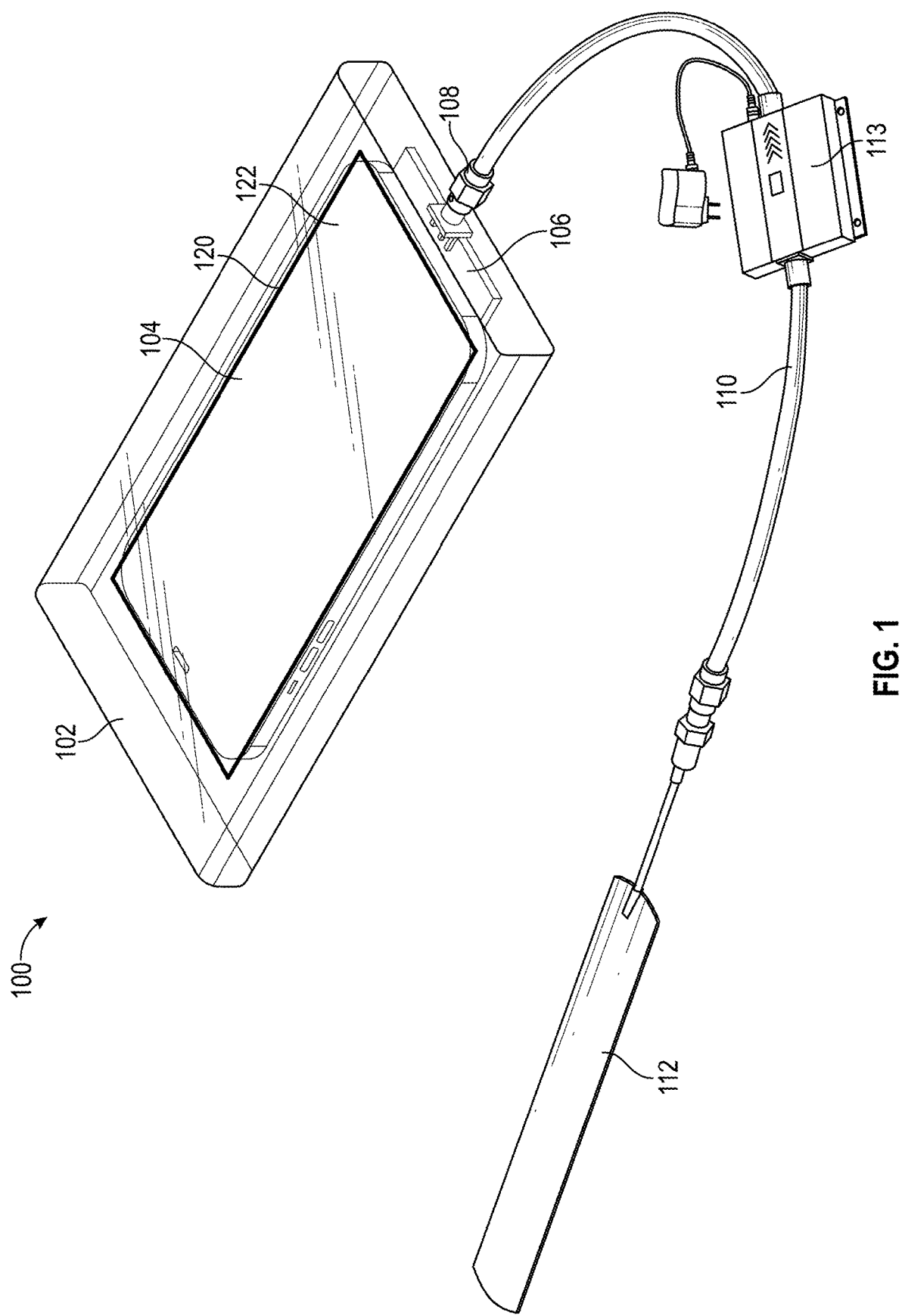
FIG. 1 illustrates a front, bottom, side perspective view of a cellphone signal enclosure system.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need to block the radiation exposure to a user of a wireless device, while simultaneously allowing the device to continue its functionality. There is a further need to reduce harmful light spectrums. The cellphone signal enclosure system disclosed herein solves these and other problems.

Generally, a cellphone signal enclosure system comprises an external antenna coupled to an enclosure (e.g., housing, pouch, etc.) via a cable, the enclosure preventing radio frequency (RF) signals from exiting the enclosure. As a result, a user may safely use a device enclosed therein without exposure to RF signals. The length of the cable may allow the external antenna to be placed at a safe distance, such as exterior to a house or at a desired distance away from the phone location.

Referring now to FIGS. 1-4, a cellphone signal enclosure system 100 comprises a faraday enclosure 102 for receiving and enclosing a wireless device 104 (e.g., cellphone, smartphone, tablet, etc.). The faraday enclosure 102 comprises an internal antenna 106 for wireless communication with the wireless device 104. The internal antenna 106 has a connector 108 exposed on the exterior of the faraday enclosure 102 for coupling to a cable 110. The cable 110 is couplable, on an opposite end, to an external antenna 112. In other words, the external antenna 112 sends and receives signals, via the cable 110, to the internal antenna 106, the internal antenna 106 in communication with a wireless device 104 inside the faraday enclosure 102.

This allows the wireless device 104 to continue in operation when placed within the faraday enclosure 102, overcoming limitations in the prior art. This can be extremely beneficial, such as when a user may desire to reduce RF exposure while sleeping, yet allow their phone to remain operational so as to receive emergency communication and other significant notifications.

It will be appreciated that the cellphone signal enclosure system 100 may operate as a passive device with no requirement for amplification or modulations. In some embodiments, as shown in FIG. 1, the cellphone signal enclosure system 100 may comprise an RF signal amplifier 113 coupled between the internal antenna 106 and the external antenna 112, configured to enable weaker RF signals to be received by and sent with a wireless device 104, however it is not required.

The faraday enclosure 102 is manufactured from materials known in the art to prohibit RF signals from exiting the faraday enclosure 102, thereby preventing RF exposure to a user. For example, conductive metals with magnetic permeability may be configured in wire mesh, metallic sheets, coils of wire, or other arrangements to create a faraday cage that produces conductive covering and RFI shielding. While the term "RF signal" is used herein to denote radiofrequency signals, the term "RF signal" is not limited to radiofrequency signals and may include cellular, GPS, Wi-Fi, Bluetooth, RFID, NFC, EMR, EMP, EMF, and non-ionizing radiation.

The connector 108 may be a subminiature version A (SMA) connector, semi-precision coaxial RF connector, or any other connecting mechanism configured to transmit mobile phone signal and network access to and from the internal antenna 106. The cable 110 may be any electrical cable suitable for transmission of signals, such as a coaxial cable having an inner conductor surrounding by a concentric conducting shield, with the two separated by a dielectric. The connection between the connector 108 and the cable 110 helps ensure that the faraday enclosure 102 prevents any RF signal from escaping. The external antenna 112 may be, without limitation, an active or passive antenna, such as an Abracon APAMS-118 or APAMSJ-137 model having the capacity to transmit frequencies, signals, and protocols including 2.4 GHz, 5 GHz, Bluetooth, Wi-Fi, WLAN, Zigbee, GSM, LTE, 2G/3G/4G/5G, and other signals commonly relayed between commercial and consumer electronic devices.

Figure 5:
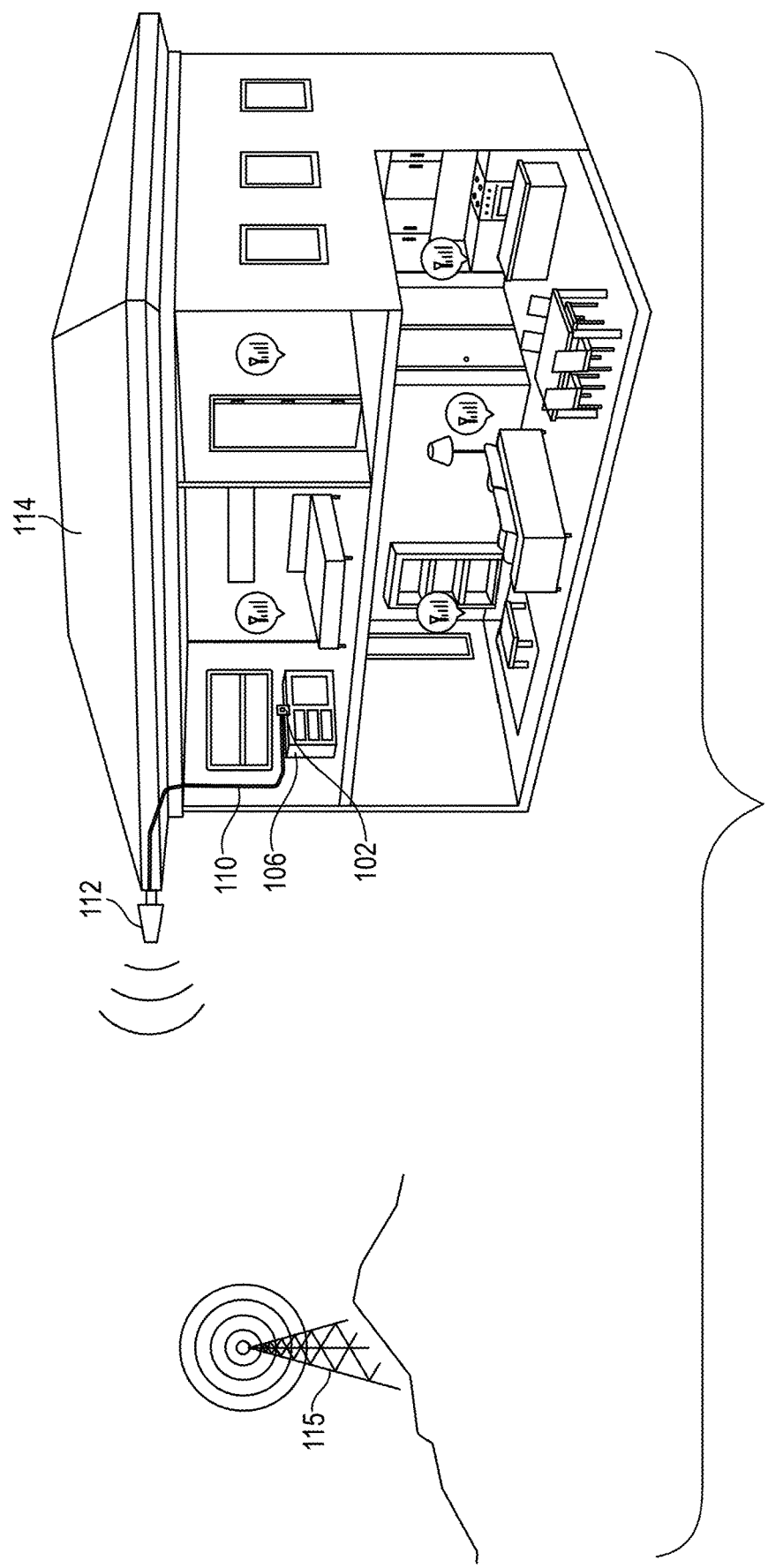
FIG. 5 illustrates a cellphone signal enclosure system in use in a house.

Additionally, the cable 110 may vary in length, allowing customization by a user. Accordingly, a user may mix and match enclosures 102 and cables 110 for their desired use. For example, some users may prefer the external antenna 112 be positioned at a greater distance away from the faraday enclosure 102 than others in order to further their proximity to any RF signal transmission. As shown in FIG. 5, the external antenna 112 may be located on the exterior of a building 114 (e.g., home, office, etc.) with the cable 110 extending to the desired location within the building 114, such as on a nightstand 116, or any other desired location, where it is coupled to the faraday enclosure 102. Other users may simply place the external antenna 112 across the room or in an adjacent room, depending on their preferences.

Figure 2:
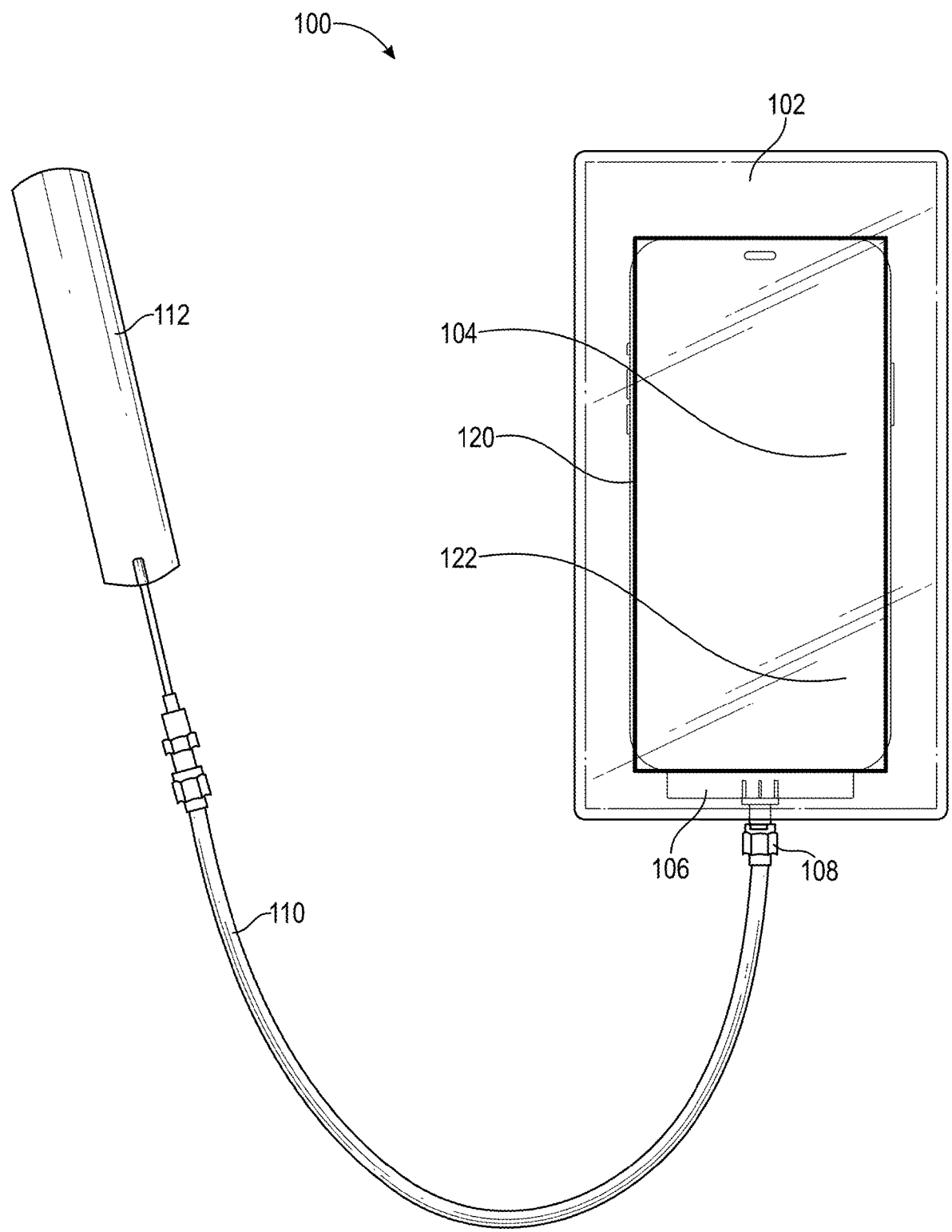
FIG. 2 illustrates a front elevation view of a cellphone signal enclosure system.

In some embodiments, as shown in FIGS. 1-2, the faraday enclosure 102 may comprise a flexible and transparent, touch-sensitive window 120, allowing a user to interact with the wireless device 104 therein. The touch-sensitive window 120 allows a user to continue to use any wireless device 104 having a touchscreen, despite it being within the faraday enclosure 102. For example, a user may decide to utilize the system 100 in common locations for prolonged cellphone use, such as on a couch or bed. A user may place the wireless device 104 within the faraday enclosure 102 and continue to use the wireless device 104 via the touch-sensitive window 120 while avoiding exposure to RF signals. In some embodiments, the touch-sensitive window 120 further comprises a blue light filter 122 that blocks blue light. It will be appreciated that the blue light filter 122 reduces eye strain in addition to reducing RF exposure.

Figure 3:
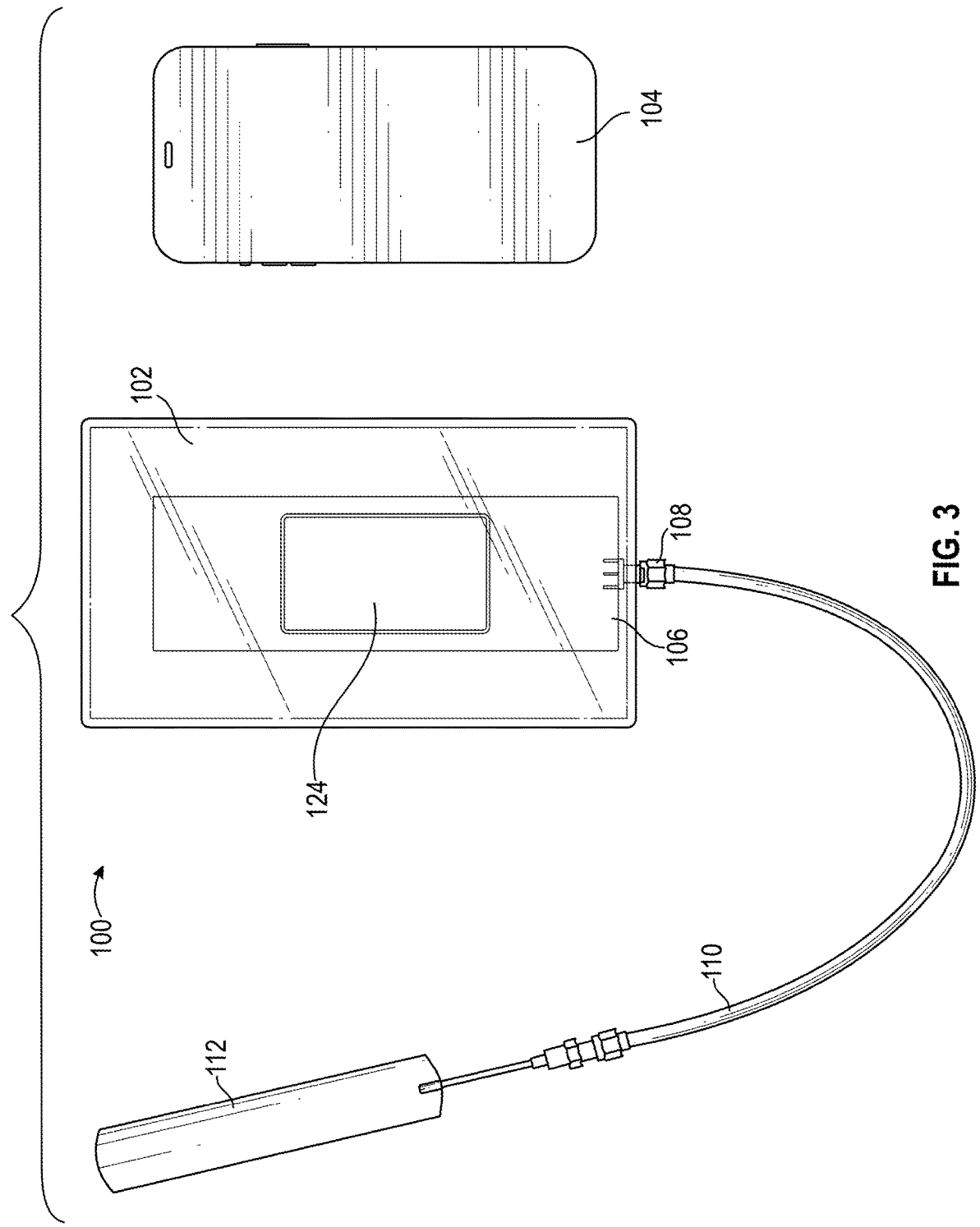
FIG. 3 illustrates a front, side perspective view of a cellphone signal enclosure system with a wireless device outside an enclosure.
Figure 4:
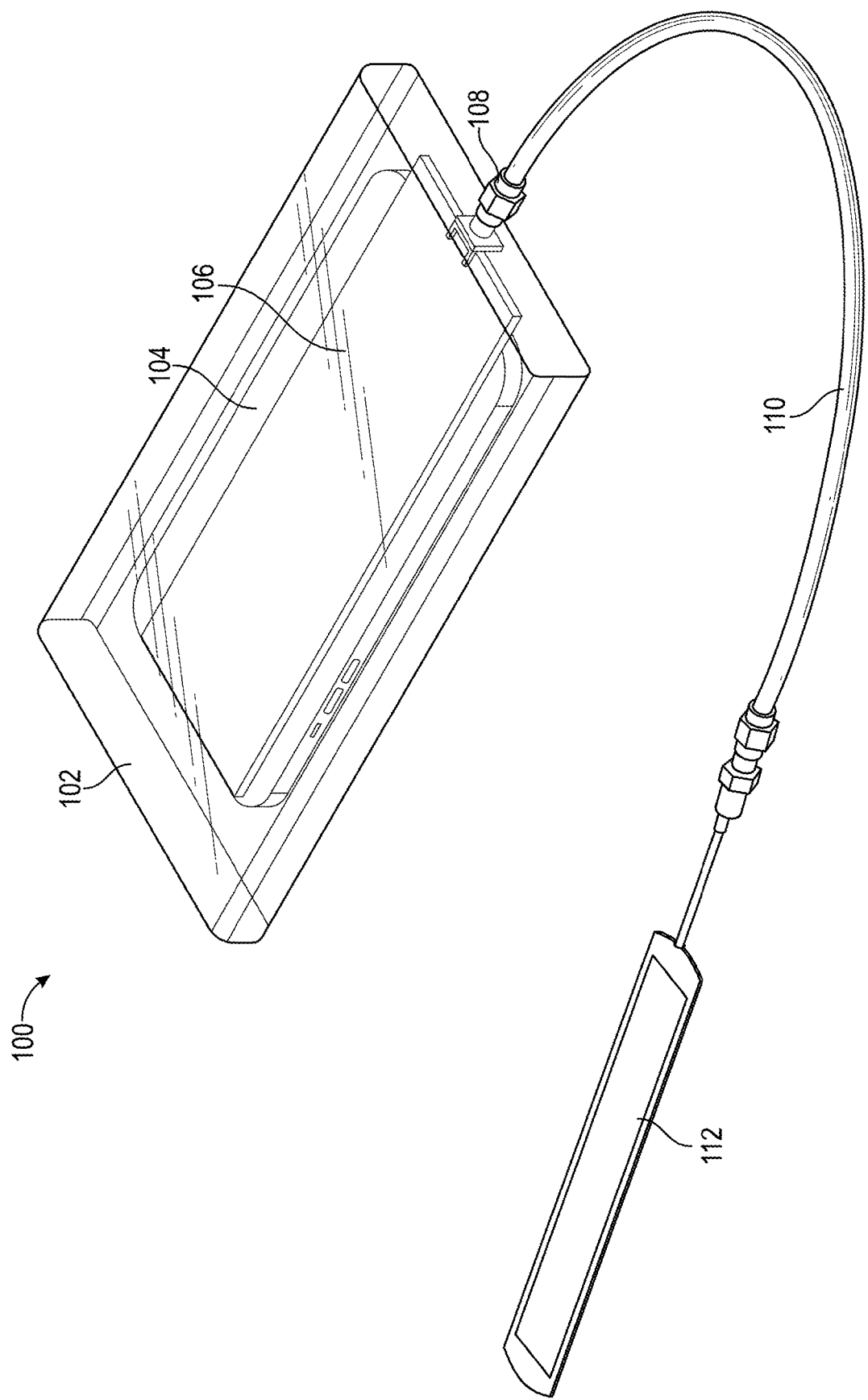
FIG. 4 illustrates a rear, bottom, side perspective view of a cellphone signal enclosure system.

As shown in FIG. 3, in some embodiments, the faraday enclosure 102 may comprise a wireless charger 124, allowing the wireless device 104 to charge when placed within the faraday enclosure 102. The wireless charger 124 may comprise a magnetic surface that magnetically couples to the wireless device 104, ensuring optimal connection for inductive charging. A power cord may be incorporated into the cable 110 or otherwise exit the enclosure 104 through an additional port. Alternately, in some embodiments, the faraday enclosure 102 is configured to allow magnetic fields to pass therethrough, allowing a user to utilize a third-party wireless charger. In other words, a user may simply place the back of the faraday enclosure 102 on a wireless charger such that the wireless device 104 located therein is able to interact with the magnetic field of the wireless charger.

In some embodiments, a method of using a cellphone signal enclosure system 100 comprises placing a wireless device 104 within a faraday enclosure 102, thereby blocking wireless RF signals to and from the wireless device 104. An external antenna 112 then transmits mobile phone signals and network access to an internal antenna 106 within the enclosure via a cable 110. The wireless device 104 receives the mobile phone signals from the internal antenna 106. A user receives and views any notifications on the wireless device 104 through a flexible and transparent, touch-sensitive window 120 on the faraday enclosure 102. Likewise, a user may send communications from the wireless device 104 through the flexible and transparent, touch-sensitive window 120 on the faraday enclosure 102. In some embodiments, a wireless charger 124 inductively charges the wireless device 104 while housed within the faraday enclosure 102 and an RF signal amplifier 113 amplifies the mobile phone signal transmitted by the internal antenna 106.

While discussed herein as being beneficial for health and wellness, it will be appreciated that the cellphone signal enclosure system 100 may be used for other purposes without departing herefrom. For example, some structures may have limited cellphone signal on their interior. By using the cellphone signal enclosure system 100 disclosed herein, the external antenna 112, in communication with a cell tower 115 (FIG. 5) or satellite, may be placed on the exterior of a structure 114 with the cable 110 carrying the signals to a location within the structure that may not have otherwise had signal, allowing a user to use the wireless device 104 when placed within the faraday enclosure 102. For example, a user would be able to have cell phone signal within a basement that may otherwise not have reception.

Furthermore, the cellphone signal disclosure system 100 is also beneficial for security and privacy purposes, wherein the faraday enclosure 102 prevents nearby devices from communicating directly with the wireless device 104 and intercepting communications. For example, the cellphone signal enclosure system 100 provides protection against hacking, tracking, eavesdropping via listening devices, data extraction, or wiping of data from the wireless device 104. Therefore, other uses of the cellphone signal enclosure system 100 are contemplated and such uses do not depart herefrom.

In some embodiments, the cable 110 is not detachable from the faraday enclosure 102, which may be beneficial in reducing fail points, among other things. When the cable 110 is permanently coupled to the faraday enclosure 102, the potential for a leaky seal or gap in the coupling is reduced, ensuring containment of the RF signals emitted by the wireless device 104.

Figure 6:
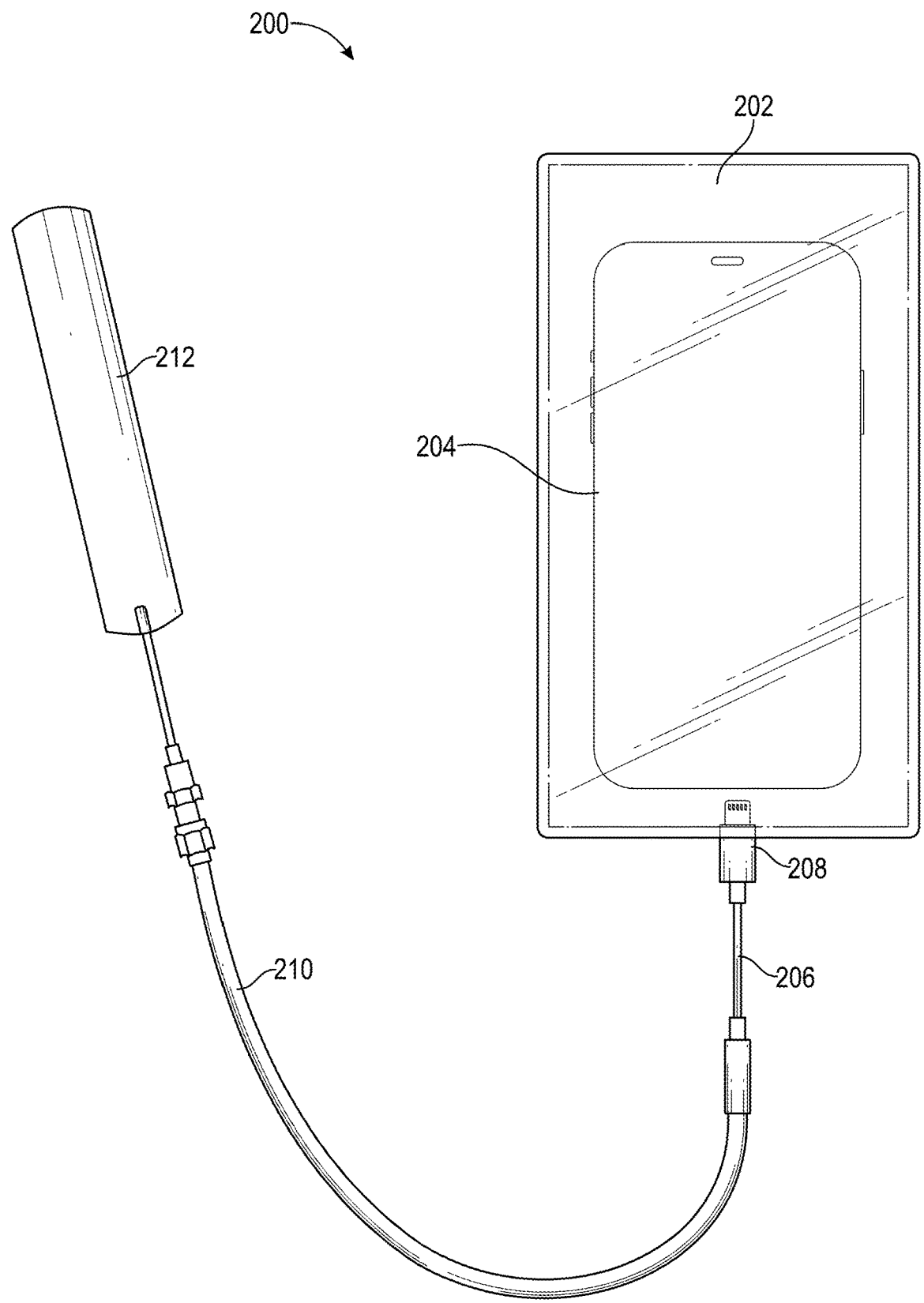
FIG. 6 illustrates a front elevation view of a cellphone signal enclosure system comprising an adapter.

In some embodiments, an internal antenna 106 may not be required. For example, referring to FIG. 6, a cellphone signal enclosure system 200 may comprise a faraday enclosure 202 configured to receive a wireless device 204 therein, and coupler 206 configured to couple to the wireless device 204 therein. In other words, the coupler 206 may comprise a plug or adapter 208 such as a USB-C, micro-USB, Apple® lightning plug, or other wireless device cable type that is couplable directly to the wireless device 204. In such embodiments, the internal antenna 106 may be omitted, wherein the wireless device 204 receives direct, wired network access and mobile phone signal from the cable 210 via the coupler 206.

Figure 7:
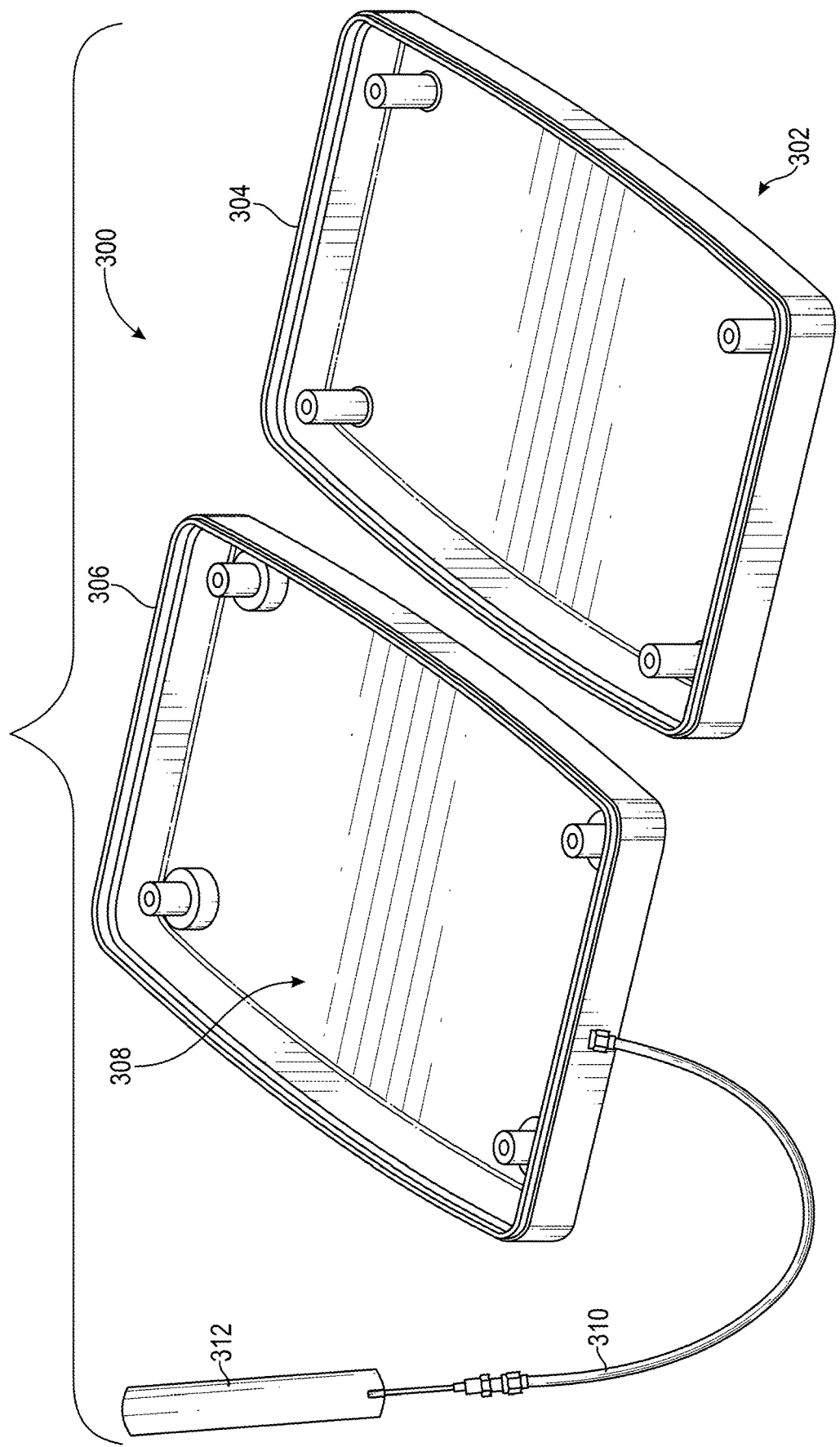
FIG. 7 illustrates a perspective view of a cellphone signal enclosure system in an open configuration.

It will further be appreciated that the faraday enclosure may be any size and shape, allowing for uses by a variety of devices. For example, as shown in FIG. 7, a signal enclosure system 300 comprises a faraday enclosure 302, wherein the faraday enclosure 302 comprises a front portion 304 couplable to a rear portion 306 creating an internal housing 308 sized so as to receive a wireless device (e.g., phone, tablet, etc.) therein. A cable 310 is coupled to the faraday enclosure 302, providing signals to the internal housing 308 via an external antenna 312. As a result, when a wireless device is inserted between the front portion 304 and the rear portion 306, the internal housing is sealed, forming the faraday enclosure 302 and prohibiting wireless signals from passing therethrough. The front portion 304 may be couplable to the rear portion 306 using any known methods, including interference fit, tongue and groove, clips, etc.

Figure 8:
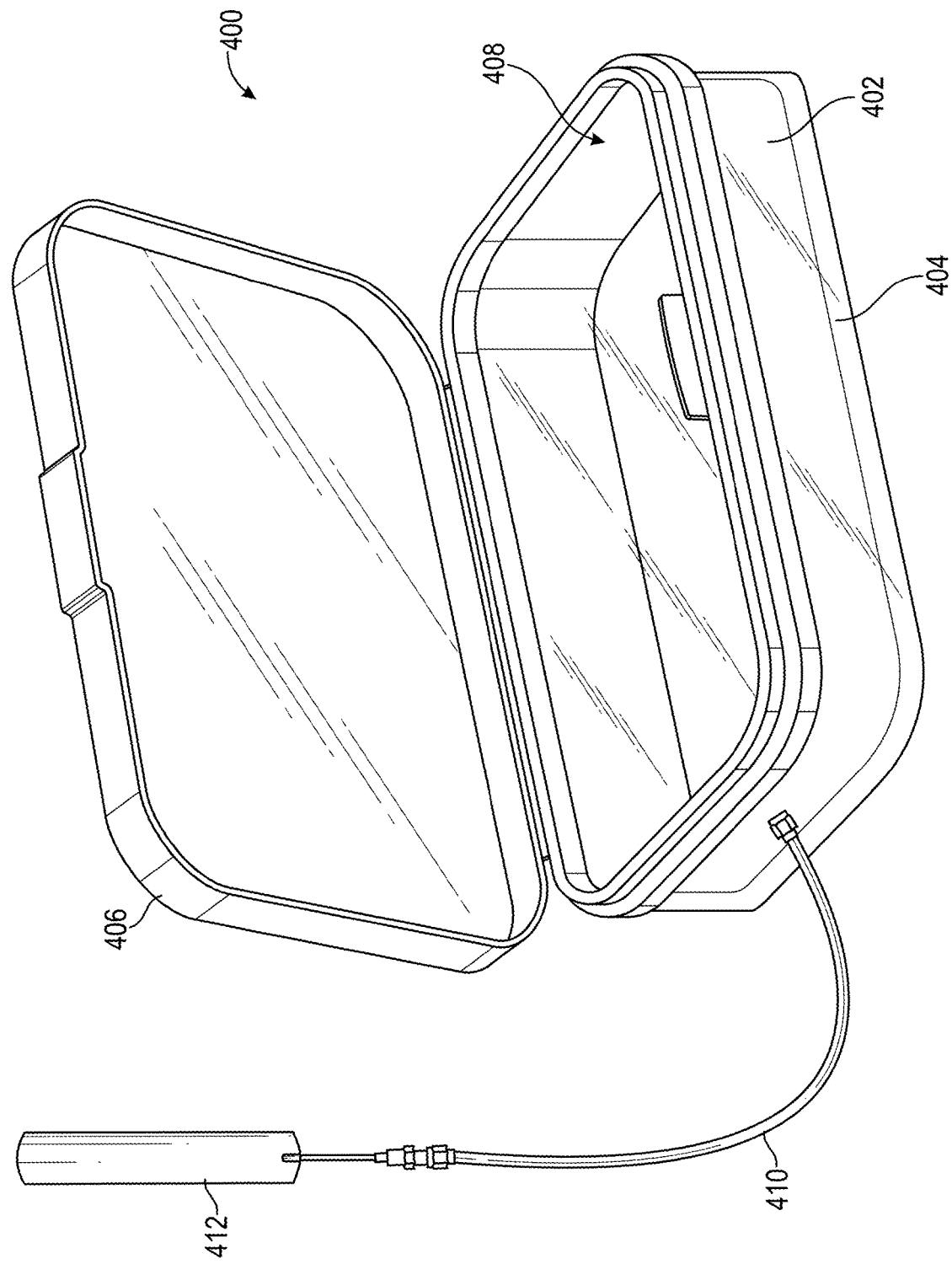
FIG. 8 illustrates a perspective view of a cellphone signal enclosure system in an open configuration.

Referring to FIG. 8, a signal enclosure system 400 comprises a faraday enclosure 402 comprising a bottom portion 404 and a lid 406 hingedly coupled to the bottom portion 404, configured to enclose an inner space 408 sized so as to receive a wireless device (e.g., phone, tablet, etc.) therein. A cable 410 is coupled to the faraday enclosure 402, providing RF signals to the inner space 408 via an external antenna 412. In other words, when a wireless device is enclosed within the inner space 408 and the lid 406 is closed on the bottom portion 404, the inner space 408 is sealed, forming the faraday enclosure 402 and prohibiting RF signals (or other signals) from passing therethrough. In other words, the faraday enclosure 402 comprises materials to prevent RF and other signals from passing therethrough.

Figure 9:
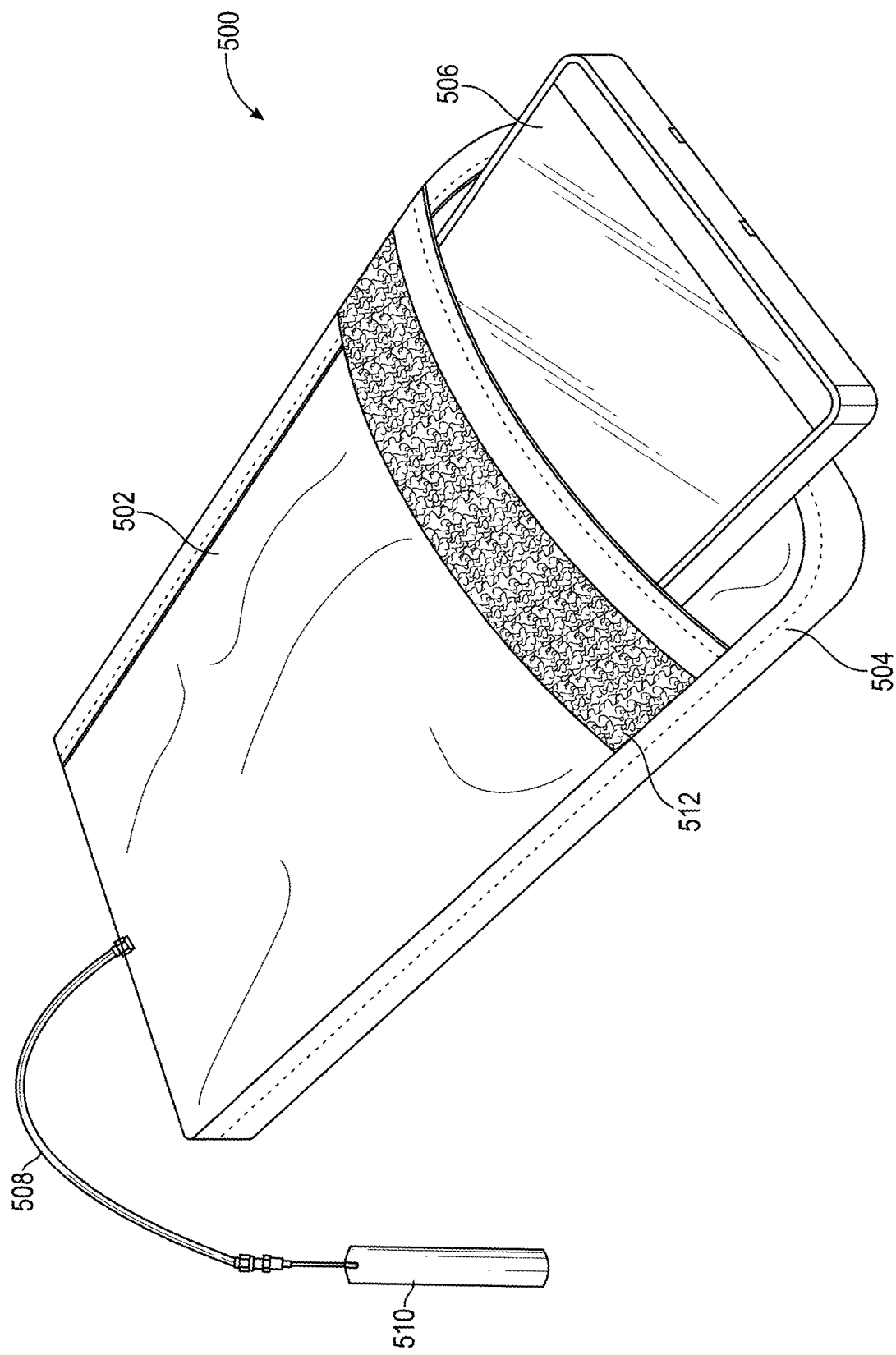
FIG. 9 illustrates a perspective view of a cellphone signal enclosure system in an open configuration.

Referring to FIG. 9, a signal enclosure system 500 comprises a faraday pouch 502, a flap 504 for closing the faraday pouch 502, the faraday pouch 502 sized so as to receive a wireless device 506 therein when the flap 504 is closed, and a cable 508 coupled to the faraday pouch 502 for providing signal to the wireless device 506 within the faraday pouch 502. The cable 508 may be directly couplable to the wireless device 506, or may be coupled to an internal antenna (as shown and discussed earlier herein), allowing the wireless device 506 to receive and transmit, via the cable 508, when within the faraday pouch 502. The cable 508 is coupled, at the opposite end, to an external antenna 510. The flap 504 may be closable using any known closure mechanism 512, such as hook and loop (e.g., Velcro®), snaps, buckles, magnets, clasps, etc. In some embodiments, rather than a flap 504, the faraday pouch 502 may be closable using a zipper, opposing sliding channels (e.g., Ziploc®), or other suitable mechanisms.

In other words, any number of form factors may be used for the faraday enclosure without departing herefrom. Additionally, any enclosure disclosed herein may be sized so as to enclose more than one device, such as multiple cellphones, tablets, etc. and may have windows for viewing a device therein, built-in charging ports (either wired or wireless charging), or other features disclosed herein.

Accordingly, the cellphone signal enclosure system 100-500 disclosed herein solves the need to block the radiation exposure to a user of a wireless device while simultaneously allowing the wireless device to continue its functionality and signal connectivity, overcoming the prior art. The cellphone signal enclosure system 100-500 may also amplify the signal strength of the wireless device and provide additional security measures during use.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A cellphone signal enclosure system, comprising:
    a faraday enclosure, comprising:
        a flexible and transparent, touch-sensitive window on a first surface of the faraday enclosure configured to allow interaction with a wireless device housed within the faraday enclosure;
        a connector coupled to the faraday enclosure configured to transmit a signal to an interior of the faraday enclosure; and
        a blue light filter;
    an external antenna configured to transmit radiofrequency signals; and
    a cable coupled to the external antenna on a first end and to the connector on a second end.

2. The cellphone signal enclosure system of claim 1, wherein the enclosure is a pouch.

3. The cellphone signal enclosure system of claim 2, wherein the pouch comprises a flap that is closable.

4. The cellphone sign enclosure system of claim 1, wherein the enclosure comprises a bottom portion and a lid hingedly coupled to the bottom portion.

5. The cellphone sign enclosure system of claim 1, wherein the enclosure comprises a front portion couplable to a rear portion creating an internal housing sized so as to receive the wireless device therein.

6. The cellphone signal enclosure system of claim 1, further comprising an internal antenna within the faraday enclosure configured to transmit and receive radiofrequency signals between the external antenna and the wireless device via the cable.

7. The cellphone signal enclosure system of claim 1, wherein the coupler further comprises an adapter for coupling directly to a port of a wireless device.

8. The cellphone signal enclosure system of claim 1, further comprising a wireless charger configured to provide inductive charging to the wireless device within the enclosure.

9. The cellphone signal enclosure system of claim 1, further comprising a radiofrequency signal amplifier.

10. A cellphone signal enclosure system, comprising:
    a faraday enclosure, comprising:
        a flexible and transparent, touch-sensitive window on a first surface of the faraday enclosure that enables interaction with a wireless device housed within the faraday enclosure;
        a connector coupled to the enclosure;
        an internal antenna positioned inside the faraday enclosure and configured to transmit radiofrequency signals;
        a wireless charger configured to provide inductive charging to the wireless device within the faraday enclosure; and
        a blue light filter;
    an external antenna positioned outside the enclosure and configured to transmit radiofrequency signals;
    a cable coupling the external antenna to the internal antenna via the connector.

11. The cellphone signal enclosure system of claim 10, further comprising a radiofrequency signal amplifier.

12. The cellphone signal enclosure system of claim 10, wherein the faraday enclosure is a pouch.

13. The cellphone sign enclosure system of claim 10, wherein the faraday enclosure comprises a bottom portion and a lid hingedly coupled to the bottom portion.

14. The cellphone signal enclosure system of claim 10, wherein the wireless device is a mobile phone, smartwatch, or tablet.

15. The cellphone sign enclosure system of claim 10, wherein the external antenna is positioned on an exterior of a building and the faraday enclosure is positioned in an interior of the building.

* * * * *